(12) United States Patent
Aurongzeb et al.

(10) Patent No.: US 10,013,547 B2
(45) Date of Patent: *Jul. 3, 2018

(54) SYSTEM AND METHOD FOR MOTION GESTURE ACCESS TO AN APPLICATION AND LIMITED RESOURCES OF AN INFORMATION HANDLING SYSTEM

(71) Applicant: Dell Products, LP, Round Rock, TX (US)

(72) Inventors: Deeder M. Aurongzeb, Round Rock, TX (US); Liam B. Quinn, Austin, TX (US); Richard W. Schuckle, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/438,307

(22) Filed: Feb. 21, 2017

(65) Prior Publication Data

US 2017/0161484 A1 Jun. 8, 2017

Related U.S. Application Data

(63) Continuation of application No. 14/161,848, filed on Jan. 23, 2014, now Pat. No. 9,613,202.

(51) Int. Cl.
*G06F 21/36* (2013.01)
*G06F 21/62* (2013.01)
*G06F 3/01* (2006.01)

(52) U.S. Cl.
CPC .............. *G06F 21/36* (2013.01); *G06F 3/017* (2013.01); *G06F 21/6218* (2013.01)

(58) Field of Classification Search
CPC ...... G06F 21/36; G06F 21/6218; G06F 3/017; G06F 3/0488; G06F 3/041; G06F 3/0416; G06F 21/31; G06F 3/0346; G06F 21/121
See application file for complete search history.

(56) References Cited

U.S. PATENT DOCUMENTS

| | | |
|---|---|---|
| 6,094,341 A | 7/2000 | Lin |
| 7,136,282 B1 | 11/2006 | Rebeske |
| 7,821,780 B2 | 10/2010 | Choy |

(Continued)

FOREIGN PATENT DOCUMENTS

| | | |
|---|---|---|
| WO | WO 2012/044516 A2 | 5/2012 |
| WO | WO 2013/107318 A1 | 7/2013 |

OTHER PUBLICATIONS

K. Hinckley and H. Song, "Sensor Synaesthesia: Touch in Motion, and Motion in Touch," CHI 2011 Session: Gestures, Body & Touch, May 7-21, 2011, pp. 801-810.

(Continued)

*Primary Examiner* — Catherine B Thiaw
(74) *Attorney, Agent, or Firm* — Prol Intellectual Property Law, PLLC; H. Kenneth Prol

(57) ABSTRACT

An information handling system includes a processor that determines a first orientation from orientation sensors and a sensor hub for detecting a motion gesture. The processor is further activated from a sleep state by the motion gesture and the information handling system includes a limited, ad-hoc access system that permits ad-hoc access to limited user pre-set or context-based system resources in response to the sudden motion gesture.

20 Claims, 6 Drawing Sheets

(56) References Cited

U.S. PATENT DOCUMENTS

| | | |
|---|---|---|
| 8,261,212 B2 | 9/2012 | Wigdor |
| 9,119,068 B1 | 8/2015 | Hubble |
| 9,524,139 B2 | 12/2016 | Aurongzeb |
| 9,654,977 B2 * | 5/2017 | Aissi ............... H04W 12/08 |
| 2003/0103091 A1 | 6/2003 | Wong |
| 2003/0142469 A1 | 7/2003 | Ponx |
| 2005/0237269 A1 | 10/2005 | Connor |
| 2006/0026535 A1 | 2/2006 | Hotelling |
| 2006/0052109 A1 | 3/2006 | Ashman |
| 2006/0109259 A1 | 5/2006 | Ohta |
| 2008/0008313 A1 | 1/2008 | Fyke |
| 2008/0163286 A1 | 7/2008 | Rudolph |
| 2008/0218535 A1 | 9/2008 | Forstall |
| 2008/0274722 A1 | 11/2008 | Kim |
| 2009/0083847 A1 | 3/2009 | Fadell |
| 2009/0138802 A1 | 5/2009 | Yamashita |
| 2009/0224914 A1 | 9/2009 | Wehrenberg |
| 2009/0265671 A1 | 10/2009 | Sachs |
| 2009/0296331 A1 | 12/2009 | Choy |
| 2010/0007613 A1 | 1/2010 | Costa |
| 2010/0031203 A1 | 2/2010 | Morris |
| 2010/0070926 A1 | 3/2010 | Abanami |
| 2010/0095773 A1 | 4/2010 | Shaw |
| 2010/0161084 A1 | 6/2010 | Zhao |
| 2011/0032199 A1 | 2/2011 | Seo |
| 2011/0187497 A1 | 8/2011 | Chin |
| 2011/0215952 A1 | 9/2011 | Aria |
| 2011/0283241 A1 | 11/2011 | Miller |
| 2011/0304648 A1 | 12/2011 | Kim |
| 2012/0007713 A1 | 1/2012 | Nasiri |
| 2012/0007820 A1 | 1/2012 | Lee |
| 2012/0023573 A1 * | 1/2012 | Shi ............... G06F 3/04883 726/17 |
| 2012/0031439 A1 | 2/2012 | Richie |
| 2012/0032877 A1 | 2/2012 | Watkins |
| 2012/0090023 A1 | 4/2012 | Chow |
| 2012/0154108 A1 | 6/2012 | Sugaya |
| 2012/0176353 A1 | 7/2012 | Ishii |
| 2012/0233571 A1 | 9/2012 | Wever |
| 2012/0284297 A1 | 11/2012 | Aguera-Arcas |
| 2012/0311499 A1 | 12/2012 | Dellinger |
| 2013/0022235 A1 | 1/2013 | Pettit |
| 2013/0042209 A1 | 2/2013 | de Leon |
| 2013/0063344 A1 | 3/2013 | Obermuller |
| 2013/0082939 A1 | 4/2013 | Zhao |
| 2013/0127905 A1 | 5/2013 | Zhang |
| 2013/0176291 A1 | 7/2013 | Leonard |
| 2013/0191911 A1 | 7/2013 | Dellinger |
| 2013/0201101 A1 | 8/2013 | Niu |
| 2013/0318628 A1 * | 11/2013 | Dunko ............... G06F 3/0487 726/28 |
| 2013/0321265 A1 | 12/2013 | Bychkov |
| 2013/0346921 A1 * | 12/2013 | Shiplacoff ......... G06F 3/0488 715/835 |
| 2014/0009445 A1 | 1/2014 | Kim |
| 2014/0013143 A1 | 1/2014 | Park |
| 2014/0019510 A1 | 1/2014 | Kamiya |
| 2014/0068755 A1 | 3/2014 | King |
| 2014/0143149 A1 | 5/2014 | Aissi |
| 2014/0149754 A1 | 5/2014 | Silva |
| 2014/0181535 A1 | 6/2014 | Smith |
| 2014/0232633 A1 | 8/2014 | Shultz |
| 2014/0258937 A1 | 9/2014 | Lee |
| 2014/0365803 A1 | 12/2014 | Pham |
| 2015/0012416 A1 | 1/2015 | Woods |
| 2015/0065170 A1 | 3/2015 | Brisebois |
| 2015/0116362 A1 | 4/2015 | Aurongzeb |
| 2015/0186397 A1 * | 7/2015 | Cueto ............... G06F 17/30126 715/854 |

OTHER PUBLICATIONS

N. Ravi, J. Scott, H. Lu, L. Iftode, "Context-aware Battery Management for Mobile Phones," In Pervasive Computing and Communications, p. 224-233, 2008, p. 1-10.

Marek Novotny, "Microsensors for Contactless Angle Sensing," Sep. 23, 2014 http://www.ac.tut.fi/aci/courses/ACI-51106/pdf/Angle/AngleSensing.pdf, p. 1-9.

This End Up: Using Device Orientation, by Pete LePage, Apr. 29, 2011, http://www.html5rocks.com/en/tutorials/device/orientation/, p. 1-17.

NEC Unveils Bizarre Dual-Screen Medias W N-05E CNET Editor's Take, Feb. 26, 2013, http://www.cnet.com/products/nec-medias-w-n-05e/, p. 1-8.

Position Sensors; Android Developers, Sep. 6, 2013; http://developer.android.com/guide/topics/sensors/sensors_position.html, p. 1-5.

Passive and Active Cooling Modes; Oct. 12, 2013, http://msdn.microsoft.com/en-us/library/windows/hardware/hh698271(v=vs.85).aspx, p. 1-2.

"Procedure for Developing Intuitive and Ergonomic Gesture Interfaces for Man-Machine Interaction," Nielsen, Aalborg University, Laboratory of Computer Vision and Media Technology, Denmark, Technical Report CVMT 03-01, ISSN 1601-3646, CVMT, Aalborg University, Mar. 2003, pp. 1-12.

* cited by examiner

SYSTEM AND METHOD FOR MOTION GESTURE ACCESS TO AN APPLICATION AND LIMITED RESOURCES OF AN INFORMATION HANDLING SYSTEM

This application is a continuation of prior application Ser. No. 14/161,848, entitled "System and Method for Motion Gesture Access to an Application and Limited Resources of an Information Handling System," filed on Jan. 23, 2014, which is assigned to the current assignee hereof and is incorporated herein by reference in its entirety.

FIELD OF THE DISCLOSURE

This disclosure generally relates to ad-hoc application enablement with motion gesture waking of an information handling systems, and more particularly relates to initiating ad-hoc access to a sequestered application with limited access to the system resources.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as clinical healthcare data storage and distribution, financial transaction processing, procurement, stocking and delivery tracking, provision of data services and software, airline reservations, enterprise data storage, or global communications. Information handling systems may include a variety of hardware and software components that may be configured to process, store, and communicate information and may include one or more computer systems, data storage systems, and networking systems. Additionally, information handling systems may have two or more display screens for output of images and for input such as by touch screen operation. Multiple display screen information handling systems, such as dual display devices, may be devices with fully integrated display screens or display screens that are modularly connectable to the information handling system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
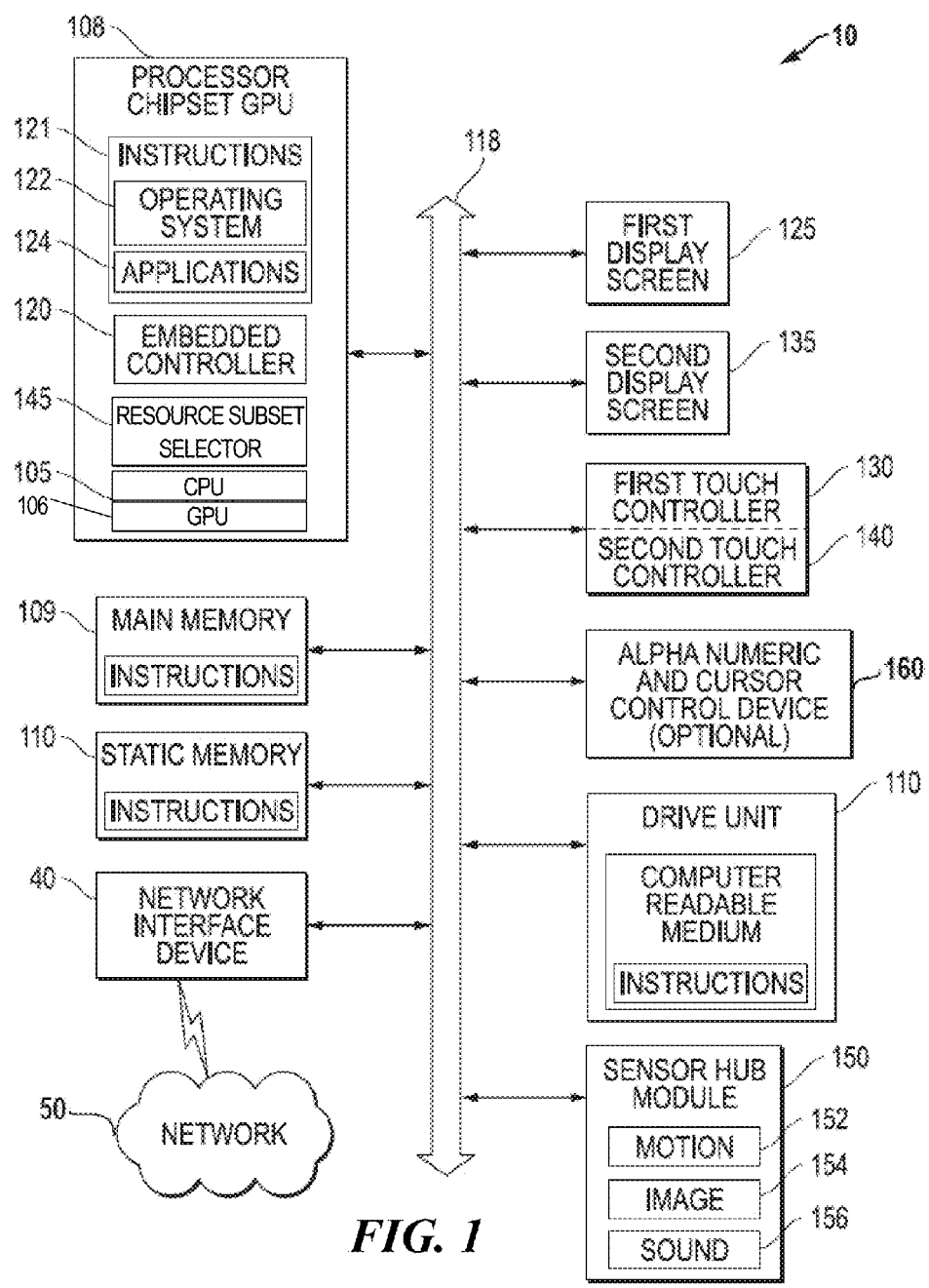
FIG. 1 is a hardware block diagram illustrating an information handling system according to an embodiment of the present disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings may be utilized in this application, as well as in other applications and with several different types of architectures such as distributed computing architectures, client or server architectures, or middleware server architectures and associated components.

Most businesses and other enterprises have sophisticated computing systems used for facilitating internal operations and for storing sensitive data, protecting access to such data, and securely communicating outside the enterprise's network, for example to exchange information with business partners, healthcare providers or the similar data exchange partners. These enterprise systems also interface with individual users. Individual users also use sophisticated computing systems to facilitate working software application contexts such as running office applications for database creation and word processing, note taking, accessing internet data applications, gaming, video playback entertainment, video and voice communications, email and other electronic communication, websurfing, music, mobile applications, and other media accesses. Much of present day information exchange is conducted electronically, via communications networks. Currently, a high degree of media entertainment and other applications are utilized and accessed electronically by users. At times, there is a need for quick access to some resources without having to navigate full security measures used to protect information handling system resources and data. Full security measures may be burdensome or unreliable, such as the nature of biometric verification systems, to grant reliable, quick and easy access in certain situations. Nonetheless, granting quick and easy access to resources should still provide a strong measure of security for the resources and data of a mobile information handling system. A method and system are described herein to permit quick and easy access to limited system resources via a simple and efficient indicator. A motion gesture may be just such a simple and efficient indicator in certain embodiments. The limited access is ad-hoc, in that it is just for the purpose of a limited access to resources that are quickly needed. The duration of access may be short. Nonetheless, the mobile information handling system must remain secure. Thus, the ad-hoc access to limited system resources is sequestered from the main system resources but files and information may be reached after a fully verified hard access or hard login is made. For example, a login password or biometric authentication may grant access the full system resources.

Additionally, traditional information handling system input devices such as keyboards and mouse systems are giving way to visual input interfaces such as touchscreens, hover detection, and motion sensing technologies. In many instances, it is substantially beneficial to grant access to limited mobile information handling system resources for quick access. Utilization of multiple display screens is desirable to facilitate usage of the information handling system during situations when immediate access is desired, but full login or security verification may be too cumbersome. Examples include when quick access to camera hardware is desired for a quick photo or quick access to one or more very recently used application is desired for discussion purposes in a work setting. Orientation and context of an information handling system may be beneficially used to determine optimal subset of system resources for limited access. The subset of system resources may include hardware and software application windows based on the anticipated priorities of usage from context. Policies for anticipated usage based on date, time, and location may prioritize which subsets of limited system resources are available for quick access as described in several embodiments herein.

Access should be fairly quick and simple. In an embodiment, the access should be quicker and simpler or more reliable than access via a hard login or biometric authentication. An example trigger for limited, ad-hoc access may via a motion gesture of the mobile information handling system. The motion gesture may be detected via orientation and motion sensors in the information handling system. Several factors are relevant in determining policies for limited, ad-hoc access to a sequestered portion of the information handling system. Factors may include location, date, time, and most recent usages of the information handling system. Additional factors may include a ranked priority of software applications, orientation mode of an information handling system such as a dual display information handling system as described in the related applications, and determination of the location of a user or multiple users with respect to the information handling system.

FIG. 1 shows an information handling system 10 including conventional information handling systems components of a type typically found in client/server computing environments. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a tablet, a PDA/smartphone, a consumer electronic device, a network server or storage device, a switch router, wireless router, or other network communication device, or any other suitable device and may vary in size, shape, performance, functionality, and price. The information handling system may include memory, one or more processing resources such as a central processing unit (CPU) 105 and related chipset(s) 108 or hardware or software control logic. Additional components of system 10 may include main memory 109, one or more storage devices such as static memory or disk drive units 110, an optional external input device 160 such as a keyboard, and a cursor control device such as a mouse, or one or more video display screens 125 and 135. The information handling system may also include one or more buses 118 operable to transmit communications between the various hardware components.

More specifically, system 10 represents a mobile user/client device, such as a single or dual screen mobile tablet computer or a mobile phone system. System 10 has a network interface device 40, such as for a wireless cellular or mobile networks (CDMA, TDMA, etc.), WIFI, WLAN, LAN, or similar network connection, enabling a user to communicate via a wired or wireless communications network 50, such as the Internet. System 10 may be configured with conventional web browser software. The web browser, may include for example Microsoft Corporation's Internet Explorer web browser software, Firefox or similar such browsers to allow the user to interact with websites via the wireless communications network 50.

System 10 may include several sets of instructions 121 to be run by CPU 105 and any embedded controllers 120 on system 10. One such set of instructions 121 includes an operating system 122 with operating system interface. Example operating systems can include those used with typical mobile computing devices such as Windows Phone mobile OS from Microsoft Corporation and Android OS from Google Inc., for example Key Lime Pie v. 5.x. Additional sets of instructions in the form of multiple software applications 124 may be run by system 10. These software applications 124 may enable multiple uses of the mobile information handling system as set forth in more detail below.

System 10 includes display screen 125 and optional display screen 135. Each display screen has a display driver operated by one or more graphics processing units 106 (GPUs) such as those that are part of the chipset 108. The GPU 106 may be integrated with the CPU 105 or may be a separate GPU chip 106 in the chipset. Each display screen also has an associated touch controller 130 and 140 to accept touch input on the touch interface of each display screen. It is contemplated that one touch controller may accept touch input from display screens 125 and 135, or as shown in the current embodiment, touch controllers 130 and 140 may operate each display screen respectively. In the current embodiment, touch controller 130 is associated with display screen 125 and touch controller 140 is associated with display screen 135.

Display screens 125 and 135 may also be controlled by the embedded controller 120 of chipset 108. Each GPU 106 and display driver is responsible for rendering graphics such as software application windows and virtual tools such as virtual keyboards on the display screens 125 and 135.

The block diagram of FIG. 1 shows the mobile information handling system 10 capable of administering each of the specific embodiments of the present disclosure. Some additional detail of another embodiment of system 10 may include main memory 109 and static memory or disk drive unit 110 that can communicate with each other and the processor chipset(s) 108 via one or more buses 118. As shown, system 10 may further include one or more video display screens 125 and 135, such as liquid crystal displays (LCD), organic light emitting diode (OLED) displays, flat panel displays, or solid state displays. System 10 can also include a signal generation device or receiving device, such as sound sensors 156 or speakers (not shown), remote control transmitters/receivers (not shown), and a network interface device 40 that may be wireless. System 10 can represent a server device whose resources can be shared by multiple client devices, or it can represent an individual client device, such as a desktop personal computer.

The mobile information handling system 10 can include a set of instructions 121 that can be executed to cause the computer system to perform any one or more of the methods or computer based functions disclosed herein. System 10 may operate as a standalone device or may be connected such as using a network, to other computer systems or peripheral devices.

In a networked deployment, the mobile information handling system 10 may operate in the capacity of a server or as a client user computer in a server-client user network environment, or as a peer computer system in a peer-to-peer (or distributed) network environment. System 10 can also be implemented as or incorporated into various devices, such as a personal computer (PC), a tablet PC, a set-top box (STB), a PDA, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, system 10 can be implemented using electronic devices that provide voice, video or data communication. Further, while a single information handling system 10 is illustrated, the term "system" shall also be taken to include any collection of systems or sub-systems that individually or jointly execute a set, or multiple sets, of instructions to perform one or more computer functions.

In providing access to the sequestered limited resources, a limited, ad-hoc access system is activated upon detection of sudden motion of the mobile information handling system with a set threshold or sequence of thresholds. For example, the threshold may be an acceleration level or a deceleration level. However, in the case of a mobile device travelling in a vehicle where there is constant change of motion, including vibration or bumping, a timer would restrict activation of the limited, ad-hoc access and shut it down after a time period has expired. Similarly, use of the limited, ad-hoc access may be limited by time as well. Detection of motion by orientation sensors 152 will wake the mobile information system. Orientation sensors 152 may also be referred to as motion sensors. In several embodiments described herein, control of granting limited access to a sequestered subset of resources is made by the embedded controller 120 in the processor chipset 108. The limited, ad-hoc access system deciphers one or more of a sequence of motions and pauses detected by the orientation sensors 152 to determined if a preselected motion gesture has been made. Then the limited, ad-hoc access system accesses a resource subset selector 145. The system designates a section of static memory or a drive unit as available for use with the limited access. A sequestered portion of memory 109 is also made available to operate the selected limited subset of resources. The processor chipset 108 with CPU 105 and GPU 106 in some embodiments may boot up a temporary limited desktop and operating system that permits restricted actions with the hardware or software applications to which ad-hoc limited access has been granted pursuant to a motion gesture or similar trigger. The limited, ad-hoc access system operating via the embedded controller 120 also enforces the limitations on the ad-hoc access before a hard login or other full security authentication is required. Limits may include a limit on time of permitted ad-hoc access, or a limit on the number of actions performed or data amounts processed. Additionally, there may be a limit on the number of times a user may access the limited resources via a trigger such as a motion gesture before a hard login is required.

The resource subset selector 145, in connection with the limited, ad-hoc access system described herein, determines priority of one or more resource subsets of hardware and software resources based on context such as day of the week, time of day, or physical location of the user and the mobile device. The resource subset selector 145 operates via the chipset 108 based upon activation of the limited, ad-hoc access system. The resource subset selector 145 also takes into account factors such as most recently used resources and the time expired since the last use of the mobile information handling system. A preset number of recently used resources may be tracked for quick retrieval for example. In addition, certain resources may not be available as part of a resource subset due to a security level of the application; for example an email application may contain sensitive information not to be made available via the sequestered, limited access. Other factors may include orientation of the information handling system or its display screen(s) 125 and 135. Determining which applications 124 were most recently operating or are currently running determines a context along with date, time and location.

System 10 of the current embodiment has a system sensor module 150. Various orientation sensors are included in this module to assist with determining the relative orientation of the mobile information handling system. Subcategories of orientation sensors include orientation sensors 152, image sensors 154, and sound sensors 156. Other orientation sensors are contemplated as well including state of usage activity sensors as discussed. Sensor system module 150 is a sensor hub, or an accumulator device, that collects raw data from connected orientation sensors, and organizes and processes data received from the connected sensors. The sensor hub also processes raw sensor data to groom the raw sensor data into a useable form of positional analysis for the mobile information handling system and its display screens. Such a sensor hub may be an independent microcontroller such as the STMicro Sensor Fusion MCU as well as other microcontroller processing systems known to persons of ordinary skill. Alternatively, it is contemplated that the sensor and fusion hub may be integrated into a core processing chipset such as CPU systems for mobile devices as available from Intel® corporation or may utilize ARM Core processors that serve as single or multiple core processors in alternative chipset systems. The sensor hub may communicate with the sensors and the main CPU processor chipset via a bus connection such as an Inter-Integrated Circuit (I2C) bus or other suitable type of multi-master bus connection.

The sensor data from the sensor hub is then further groomed by the limited, ad-hoc access system operating on the embedded controller 120 and the resource subset selector 145. A relative orientation of the mobile information handling system in space, the active motion and pauses of the mobile information handling system, orientation of the two display screens or other components are detected by the sensor hub and determined by the limited, ad-hoc access system. Context information via a resource subset selector having a context engine determines additional factors as described above when selecting a subset of resources to allow ad-hoc, limited access. As described, those factors may include location, date, time of day, as well as consideration of state of recent usage activity and a working software application context.

In one embodiment, the limited, ad-hoc access system and the resource subset selector 145 comprises a set of instructions run on CPU 105 or embedded controller 120 in the chipset(s) 108. Typically, the limited, ad-hoc access system and resource subset selector 145 interface with an application programming interface (API) found in the information handling system software to coordinate various software applications. The API may coordinate the resource subset selector 145, sensor hub input data, other independent sensor input types such as camera or touch hover detection applications, display device drivers, PMU/BMU applications controlling power, boot kernel applications for start-up and sequestering limited resources made available, and the limited, ad-hoc access system.

The sensor hub module may include multiple orientation sensor types include orientation sensors 152, image sensors 154, sound sensors 156, and other sensors. Some orientation sensors are connected through the sensor hub or accumulator device and system. Other orientation sensors may directly provide data to the limited, ad-hoc access system or the resource subset selector 145. For example, the camera system and detection of gaze or presence of a user can operate on a different set of drivers and data be groomed by a software application running on the chipset(s) 108 processors to interpret camera input. This data is then provided to the limited, ad-hoc access system or the resource subset selector 145.

Orientation sensors 152 may include one or more digital gyroscopes, accelerometers, and magnetometers. Orientation sensors 152 include reference point sensors. For example, a geomagnetic field sensor may determine position of one or both display screens of the mobile information handling system. This positional information may provide x-axis, y-axis, and z-axis positional information of the mobile information handling system relative to magnetic north pole, and there for a reference point of the device position. In one embodiment, two geomagnetic field sensors provide x-axis, y-axis, and z-axis positional information for each part of a mobile information handling system such as two display screens or a display screen and keyboard. With this data, the system determines the relative position of the information handling system in space including location of components relative to one another in orientation.

Also, a digital gyro and accelerometer may be used to detect motion and changes in position. These sensors may provide a matrix of data. In one embodiment, motion of the information handling system can also be detected in three dimensional space knowing orientation and a reference. Motion components include direction, velocity and acceleration/deceleration. In another example embodiment, the azimuth or yaw, pitch, and roll values of the device are indicated by the raw sensor data. The raw orientation data for the entire mobile information handling system is relevant to determining a motion gesture by the limited, ad-hoc access system or resource subset selector 145. In another embodiment, determination of direction, velocity, accelera-tion, azimuth, pitch, and roll data may be made for individual components of the information handling system.

In connection with a reference point, such as magnetic north as provided in one embodiment by a geomagnetic field sensor, the azimuth can be determined as a degree of rotation around a z-axis. In an embodiment, the azimuth may be the value of the z-axis relative to the device y-axis as positive angle values between 0° and 360°. It is understood that a different range of values may be assigned in different embodiments.

Based on a reference point such as provided by a geomagnetic field sensor, pitch may be determined as a degree of rotation around the x axis. In an example embodiment, the angle values may range from positive 180° to negative 180° relative to the y-axis, although other value ranges may be assigned instead.

Roll is also based on the reference value, for example that established by a geomagnetic sensor. Roll may be considered to be rotation about the y-axis and its values may range from positive 90° to negative 90°. Again, the value ranges assigned can vary for each of the azimuth, pitch, and roll as long as a set of values is used to define orientation parameters in three dimensional space.

In one embodiment, the sensor hub may communicate and receive data from the following sensors via a bus connection such as I2C: a digital gyroscope, an accelerometer, and a geomagnetic field sensor. The matrix of raw sensor data from the geomagnetic field sensor and the gyro and accelerometer sensors may be processed partly by a sensor hub or accumulator to provide orientation data for the mobile information handling system device. The sensor hub performs a fusion of data signals received from either a single sensor or multiple sensor devices. The sensor hub also processes raw sensor data to groom the raw sensor data into a useable form of positional analysis for the mobile information handling system and its components such as keyboards and display screens. In the example embodiment, the sensor hub is an independent microcontroller such as the STMicro Sensor Fusion MCU.

Typically, system 10 may also include microphones and speakers for audio input and output (not shown). The microphones and speakers are connected through an HDA Codec such as the Realtek ALC 5642 or similar such codec. Data from the microphones may serve motion sensing using a Doppler Effect detection of display screen locations.

No more than three orientation sensors are needed. A reference sensor and a motion sensor is associated with an information handling system to determine its orientation and motion. A third sensor may be either another reference sensor or a motion sensor may be associated with or attached to a second component to provide location or movement of the second component relative to the first component. Additional discussion of detection of components such as dual screens or a display screen and a keyboard are discussed in greater detail in the related applications incorporated by reference. Algorithmic calculation of the sensor data from the first display screen, such as a geomagnetic field reference sensor and an accelerometer motion sensor, may be used to determine the orientation of the information handling system according to a geomagnetic field or other reference point. Some sensor types may be combination sensor devices in certain embodiments as is known in the art. For example, a motion sensor may be used that combines the functions of a digital gyroscope and accelerometer to detect motion. Thus, one accelerometer and one digital gyroscope or one gyro-accelerometer combination devices may be used along with a reference sensor to determine the mobile information handling system orientation. Any combination of the above reference sensors and motion sensors may be used in a three sensor embodiment to determine orientation and motion of the information handling system.

It is contemplated that more sensors associated with the mobile information handling system provide more data permitting increased accuracy in determination the orientation and motion components. This has trade-offs however in materials cost, space occupancy, and power consumption however.

Other techniques are also contemplated to determine relative position and movement of the mobile information handling system. For example, Doppler Effect sound sensors may typically include one or more microphones and speakers used in connection with Doppler effect calculations to determine relative position of components in a mobile information handling system. A transmitter and microphone receiver can detect a Doppler shift in sound or ultrasound signals to measure distance or location. In one example, the Doppler Effect sensors may operate in the 0-40 kHz range to detect relative location of the hinged components of an information handling system.

Image sensors 154 may include a camera, photocell or color sensor. A photocell may detect the open or closed state of a mobile information handling system by determining hinged components are no longer in a closed position when light is detected by the photocell. Additionally, the photocell may detect ambient light levels in determining brightness levels of one or more display screens. A photocell may even be used to indicate when a display screen is oriented face down on a surface such as a table.

A camera may be used as an image sensor to provide several types of feedback. It may be used as a light sensor similar to a photocell. A camera may also be used to facilitate a reference point for orientation by detecting the presence and location of a user in front of one or more display screens. Location of a user relative to the display screen(s) of an information handling system may provide a rough user viewing vector that may be used to determine whether access is to be granted or a type of subset of resources that may be selected by the resource subset selector 145. The camera may be tasked to sense the position of a user (for example, directly in front, above, below, to the right, or to the left of the plane of the display screen) as well as using facial recognition capability as is known to the art to determine the orientation of the person's face. This information enables the system to determine if a photo/video application is desired or another type of software or hardware application is desired for quick access.

In addition to orientation sensors 152, image sensors 154, and sound sensors 156, other sensors such as a variety of state of usage activity sensors are contemplated. For example, touch or hover sensors may detect whether screen is actively being used. Proximity sensors may detect the location of a user relative to the information handling system. Proximity sensors in a least one display screen may detect the position of a user (for example, directly in front, above, below, to the right, or to the left of the plane of the display screen) and thus infer the viewing vector based on the position of the user or users. Proximity sensors may be a variety of types including infrared, radiofrequency, magnetic, capacitive or other techniques used to detect the surroundings of the information handling system. Similar to the camera, this proximity sensor information enables the system to correctly determine whether ad-hoc access is requested versus an accidental movement or to determine a subset of selected resources for ad-hoc access.

Another state of usage activity sensor is a Hall Effect sensor that may detect when a magnet, of certain polarity and strength, is in proximity to the sensor. It is used to detect the closed position of a device with two sides. For example, a Hall Effect sensor may determine when two integrably hinged display screens are closed onto one another so that a magnet in one screen triggers a Hall Effect sensor in the second screen. Alternatively, a different Hall Effect sensor may determine if the hinged display screens are open to an orientation of 360° so that the back sides of the display screens are in proximity such that a magnet located with one display screen triggers the Hall Effect sensor of the other.

Hall Effect magnets and magnetic sensors may be deployed as a type of motion sensor, such as orientation sensor 152 although it is also a position or state sensor. It is known in the art that a relative angle between a magnetic field source of known polarity and strength may be determined by strength and change to a magnetization vector detected by magneto-resistive detectors of a Hall Effect sensor. Thus, motion and relative angle may also be detected by the Hall Effect sensors. Other detectors are also contemplated such as a hinge angle detector that may be mechanical, electromechanical or another detecting method to determine how far the hinge between the two display screens has been opened. Such detectors are known in the art.

The context engine determines what software applications are operating on the mobile information handling system, if any, as well as what software or hardware applications were most recently used and when. History of software application contexts such as running office applications for database creation and word processing, note taking, accessing internet data applications, gaming, video playback entertainment, video and voice communications, email and other electronic communication, websurfing, music, mobile applications, and others are logged. The system may identify a limited number of recently used applications as a subset of resources to be quickly accessed. This number may be preset in advance. In one embodiment, the preset number may be established according to settings by a user. The number of recent applications may be different among different subsets of resources. In other words, a work-related subset may call for more recently used applications than a recreational-related subset in one example. In one example embodiment, the five most recent applications opened on the mobile information handling system may be grouped as a resource subset to be opened in a sequestered desktop or operating system upon determining a motion gesture. Any number of recently used software and hardware applications may be logged and grouped as a resource subset. The logging of recently used applications may be selective as well. The number of recently used applications for a subset of resources may also filter resources or applications deemed to sensitive to permit quick access even in the sequestered setting. For example, certain applications types may be logged, while others are not logged for grouping, according to likelihood of desirability of quick access to such an application or the security sensitivity of an application. Some applications, such as a sensitive proprietary software system, may be limited from accessibility via the limited, ad-hoc access system.

FIGS. 2A-2D illustrate a plurality of exemplary embodiments of motion gestures for activation of the limited ad-hoc access system for an information handling system. The motion gesture of the information handling system may be a single movement or a sequence of movements, or a sequence of movements and pauses in three dimensional space to activate access by the limited ad-hoc access system.

Hereinafter, a motion gesture may refer to just one movement, one or more movements, or may include a sequence of movements and pauses. In a specific embodiment of the present disclosure, a motion gesture may include lifting up the mobile device from a table or a pocket at a velocity above a specific threshold to activate the limited ad-hoc access system. Add such factors as date or location and the state of usage activity of the system and the limited ad-hoc access system determines a working software application context for the information that corresponds to a set of limited resources made available in response to the motion gesture.

In an example embodiment, the limited, ad-hoc access system may detect that a user should be in a recreational environment due to calendar designations of "vacation" or by determining that it is a weekend or after hours. Additionally, the limited, ad-hoc system may determine that the user located at a home location. In such cases, the working software application context would be recreational applications and the user may be presented with a set of limited system resources supporting recreational applications or hardware. In another example embodiment, the limited ad-hoc access system may detect that a user should be in a work environment by determining that the system is being used on a weekday during normal working hours or is scheduled by the user to be working in a calendar. In the latter case, the working software application context would be work-related applications and the user may be presented with a set of limited system resources supporting work environment applications or hardware. The set of limited system resources may be preset by a user and may include a plurality of sets of limited system resources.

The most basic gesture contemplated is one where the limited, ad-hoc access system detects an velocity or acceleration motion exceeding a threshold velocity or acceleration level, such as by lifting the mobile device. In an example embodiment, a velocity threshold should exceed 1 ft/second as detected by an accelerometer in the mobile device. In an alternative embodiment, the velocity threshold would be 0.5 ft/second. Selection of any velocity or acceleration threshold is contemplated. It is expected that threshold is selected such that inadvertent movement of the mobile device will not trigger low-security access to sequestered resources of the mobile device. Lifting the device at an acceleration or velocity threshold is the simplest, and quickest access to sequestered resources on the mobile device.

In an alternative embodiment, an acceleration may be followed by a stop (deceleration). In yet another alternative embodiment the acceleration may be followed by a pause for a short period of time. Direction of the acceleration and deceleration motions may or may not be important. The variety of orientation sensors described above, such as the accelerometer, gyroscope, geomagnetic sensor, and others are capable of detecting the acceleration, deceleration, direction of the motion gesture components. The sensor hub accepts and integrates the data from the various sensors used and may add a time component to determine pauses, etc. Several example motion gestures are illustrated in FIGS. 2A-2D.

Figure 2A:
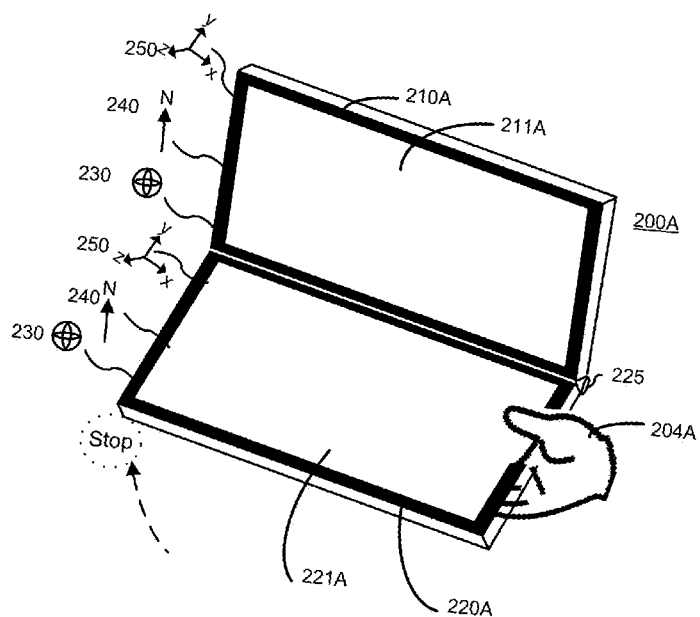
FIG. 2A illustrates an example motion gesture executed with an information handling system according to an embodiment of the present disclosure.
Figure 2B:
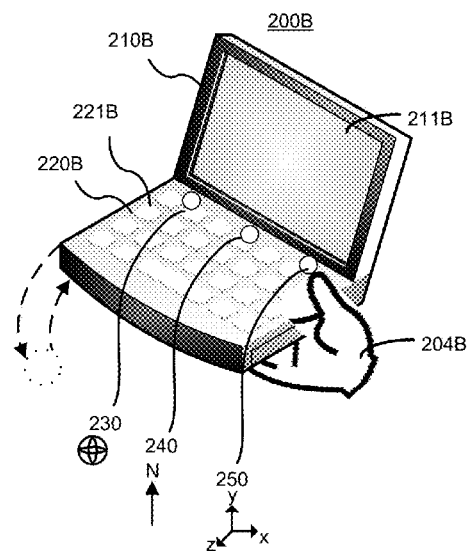
FIG. 2B illustrates another example motion gesture executed with an information handling system according to an embodiment of the present disclosure.
Figure 2C:
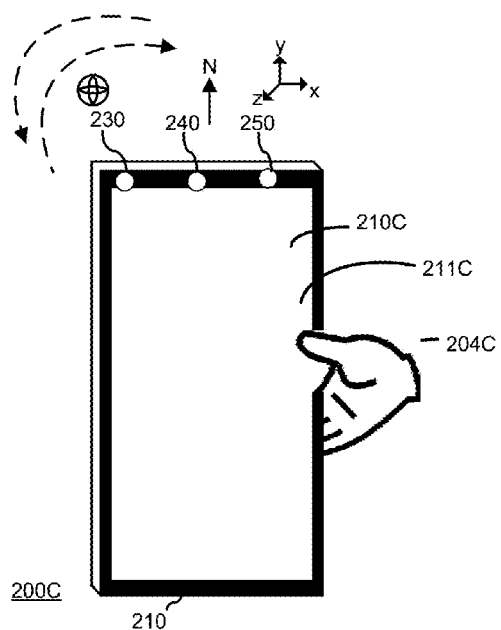
FIG. 2C illustrates another example motion gesture executed with an information handling system according to an embodiment of the present disclosure.
Figure 2D:
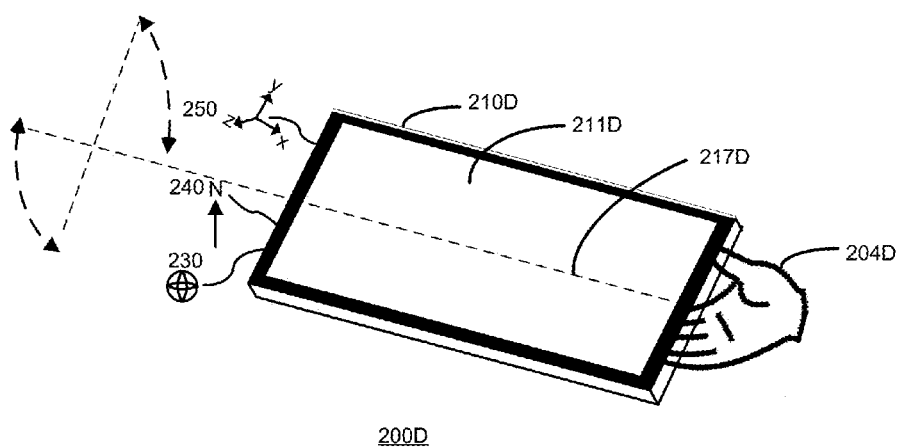
FIG. 2D illustrates another example motion gesture executed with an information handling system according to an embodiment of the present disclosure.

FIG. 2A illustrates a motion gesture which may be an upward lift motion or downward drop motion. FIG. 2B illustrates a bounce gesture. FIG. 2C illustrates a shake gesture. FIG. 2D illustrates a twist gesture. Multiple types of mobile information handling systems are contemplated to be used with the disclosures herein including laptop computers, tablet computers, smartphone devices, dual screen tablet computers, and others. Additional motion gestures beyond those illustrated or described herein are contemplated for use with activation of a limited ad-hoc access system to permit quick and limited access to limited system resources sequestered from the wider system without full login credentials. Often the motion gestures are made as simple as possible to execute, such as the motion gesture of lifting the device. This permits quick access to the limited system resources when demanded by the user without the time-consuming hard login procedures. In one embodiment, the soft login via the ad-hoc, limited access system to limited system resources may be keyed to a motion gesture made with the information handling system held in one hand. In a further embodiment, the motion gesture may pivot along a direction or angle that is easy and simple movement in accordance with the wrist of a user's right or left hand holding the information handling system when executing the desired motion or sequence of motions and pauses.

FIG. 2A shows an example of a dual display information handling system with two hinged display screens executing a motion gesture according to another embodiment of the invention. The dual display information handling system 200A is executing a lift gesture whereby the dual display information handling system 200A is lifted by a user 204A up to a stop point. In an alternative embodiment, the dual information handling system 200A is dropped by a user 204A down to a stop point. Direction of motion is not necessarily important for executing the motion gesture, but may be in specific embodiments. Just exceeding a threshold velocity or acceleration may be sufficient to trigger limited, ad-hoc access.

In one specific embodiment, the direction of the motion gesture may be relevant, but may anticipate some deviation in the motion. For example, the motion direction may vary due to variation in a user's wrist 204A pivot being roughly in a supination/pronation motion. Alternatively, the wrist 204A motion may be in a flexion/extension motion while holding the information handling system. A lift or drop may be to detect velocity of the information handling system beyond a threshold level in a roughly upward or downward direction. In an alternative embodiment an additional sequence of motion actions or pauses are contemplated. This may include an acceleration beyond a threshold level followed by a deceleration beyond a threshold deceleration level. In an additional embodiment, the lift or drop motion may require that a deceleration be followed by a stop or pause of motion. The pause may be for a predetermined period of time. Normally, this period of time will be short, such as on the order of a few seconds or less. Upon execution of the motion gesture, the limited, ad-hoc access system triggers access to limited resources.

FIG. 2A also illustrates various sensor components in a dual display information handling system embodiment to detect the components of the motion gestures according to the disclosures. One or both display screens or their respective housings may contain one or more accelerometers 250, geomagnetic sensors 240, cameras, or digital gyroscopes 230. Additional state sensors may also be present including a photocell ambient light sensor, a Hall Effect magnet and sensor, camera, touch/hover sensors, and other sensors as described above.

There is no requirement that all sensor types be present. For example, a sensor module may only need a motion detector and a reference sensor as described above for one display screen and another sensor in a second display screen. For example, either an accelerometer 250 or a gyroscope 230 and a reference sensor such as a geomagnetic sensor 240 may be associated with one display screen 211A while the other display screen 221A has a sensor to detect changes or differences between the two screens 211A and 221A. The second screen may use a second geomagnetic sensor 240, or one motion sensor such as the gyroscope 230 or accelerometer 250. The more sensor data available in each display screen 211A and 221A of the dual display information handling system, the better accuracy of the orientation and motion data and less computing required to detect and determine the motion gesture. The down side however is added expense, space usage, and power consumption that many sensors will utilize in the information handling system.

The example lift or drop embodiment of FIG. 2A may be designed to be simple to execute by the user. Thus, the orientation of the information handling system, the direction of movement, and the start and stop locations may vary to a reasonable degree to allow for variability in the motion gesture made by the user from time to time. For example, the dual display information handling system 200A has a first display screen 211A in housing 210A and a second display screen 221A in housing 220A in the disclosed embodiment. As illustrated in this embodiment, the dual display information handling system is in a portrait page orientation and the screens are oriented in a dual tablet usage mode orientation with both the first display screen 211A and the second display screen 221A viewable. First display screen 211A and second display screen 221A, or their housings 210A and 220A, are connected via a hinge structure 225 along one side of each display screen. The information handling system 200A may be tilted so that it is not in strictly portrait page orientation, but may be off by some degree although the motion gesture may still activate the limited, ad-hoc access system.

The motion gesture acceleration (and deceleration) direction may also be required to be roughly in a downward direction. A precise vector of direction is not necessary however. For example, to account for some variation due to wrist pivot, a tilt or curve in the downward direction may be accommodated by the direction of the downward acceleration (and deceleration). In an alternative embodiment, the lift motion may be a roughly upward motion gesture. In such an embodiment, similarly, the upward acceleration direction may have a tilt or curve in the motion of the information handling system 200. The balance between intention to activate required by precise movements and avoidance of inadvertent access versus ease of use and accommodation of variability may be customized via sensitivity settings for the ad-hoc, limited access system.

Hinge structure 225 may run most of the entire length of one side of each of the first display screen 211A or housing 210A and second display screen 221A or housing 220A. Alternatively, one or more hinges may be connected only at portions of the edges of the two display screens 211A and 221A or their respective housings 210A and 220A. For example, one hinge point connection may be sufficient at only one spot along the edge of the two display screens. In another embodiment, two connection points may be sufficient. In this example the two connection points may be near the ends of the hinged edges of the two display screens 211A and 221A in an example embodiment. The hinge connection 225A may include power and communication connections allowing information and power to be transferred between display screens 211A and 221A and their respective housings 210A and 220A. This will provide flexibility on where to locate various processors, power sources, connections, and sensors as between the housings of display screens 211A and 221A. In another embodiment, one or more display screens 211A and 221A may not require any housing and most or all components may be stored in the hinge connection 225 or the housing of the other display screen. The angle of the hinge connection 225 may have an impact as well and be part of a sequence of motions and pauses for a motion gesture. For example, the lift gesture may include opening the hinge of the dual screens from a laptop mode to a dual tablet mode. This could, for example, indicate to the limited, ad-hoc access system allow quick access to a camera application, and to make it viewable on both display screens as opposed to just one display screen when the hinge angle indicates that the dual display information handling system is in dual tablet mode. Differences between usage modes of a dual display information handling system is disclosed in further detail in related applications described above and incorporated herein by reference.

In yet another embodiment, the hinge connection 225 may be disconnectable to permit display screens 211A and 221A to operate as display screens connected by a wireless connection or as altogether independent information handling systems such as tablets. Magnetic connectivity may maintain the hinge structure 225 when a disconnectable hinge is connected. Wireless data connection between detachable display screens 211A and 221A may be made via wireless communication standards such as near field communication (NFC) per standards ISO 18000-3, ISO 13157 and related standards or low power Bluetooth based connections (e.g. IEEE 802.15.1) maintained between the detachable display screens. Separate power sources, such as batteries, may need to be provided for each of the display screens; however coordination of power savings strategies may still be utilized to preserve battery power on one or both devices in accordance with the disclosures herein.

FIG. 2B shows an example of a laptop information handling system executing a motion gesture according to another embodiment of the invention. The laptop information handling system 200B is executing a bounce gesture whereby the mobile information handling system 200B is bounced by a user 204B about the pivot of a user's wrist down and back to approximately the starting point of the gesture. The number of bounces up and down may predetermined as one or multiple bounce motions. Similar to the embodiment in FIG. 2A, the motion gesture in the present embodiment may anticipate some deviation in the motion due to the user's wrist 204B pivot being roughly in a supination/pronation motion. Alternatively, the wrist 204B motion may be in a flexion/extension motion while holding the information handling system.

The motion gesture acceleration and deceleration directions may thus only be roughly in a downward direction, followed by an approximate upward direction. For example, to account for some variation due to wrist pivot, a tilt or curve in the downward direction may be accommodated by the direction of the downward acceleration and deceleration. Similarly, in the upward acceleration and deceleration there may be a tilt or curve in the motion of the information handling system 200 when it returns to the original starting point for the motion gesture. In yet another variation on the embodiments disclosed, the starting point and the finishing point for the motion gesture may only be somewhat near one another or the start and finish locations of the motion gesture may not be relevant at all as long as the downward acceleration/deceleration motion followed shortly by an upward acceleration/deceleration motion is detected.

The sequence of actions for a bounce may be to accelerate in a roughly downward direction, decelerate, stop, accelerate back up in the reverse rough direction, then decelerate to a stop and pause for a predetermined amount of time. Alternatively, in a 1.5 times bounce, the downward acceleration and deceleration must be repeated before a stop and pause. In this embodiment, the starting and ending location of the motion gesture would not be the near the same location. The downward acceleration and deceleration followed by the upward acceleration and deceleration must be repeated before a stop and pause in a 2× bounce, and may be repeated multiple times for additional bounce cycles as desired. Additional bounce cycle embodiments will have an advantage of being more certain motion gestures intended to activate the limited, ad-hoc access system. This avoids potentially inadvertent movements activating access to limited system resources.

In yet another variation on the embodiments disclosed, the starting point and the finishing point for the bounce motion gesture may not be near one another. In another embodiment, the start and finish locations of the motion gesture may not be relevant at all as long as the downward acceleration/deceleration motion followed shortly by an upward acceleration/deceleration motion is detected. For example, the bounce may proceed back in an upward direction a shorter distance than the downward motion followed by a pause of predetermined duration. The sequence of actions for a bounce in this alternative embodiment may be to accelerate beyond a threshold in a roughly downward direction, a deceleration beyond a threshold deceleration, a stop of motion in the downward direction, acceleration in the return or upward direction then deceleration for a shorter period than the downward motion followed by a pause for a predetermined amount of time. The level of accuracy required to execute the motion gesture will increase the certainty that a movement is intended as a motion gesture. However, greater requirement of accuracy will make the motion gesture more difficult to execute which may be less desirable in a scenario where a user requires quick and immediate access to some of the system resources. The balance between intention to activate and avoidance of inadvertent access may be customized via sensitivity settings.

The bounce motion gesture may also begin with an initial upward motion before the first downward motion is executed. Consequently, the final pause may occur at approximately the viewing level of the user. The initial upward motion may be an optional part of the required gesture movements or may be ignored until the first downward motion is detected in the motion gesture. In other words, the laptop information handling system may be raised first before the bounce gesture triggers the limited, ad-hoc access system to access limited system resources. The system may have some motion or pause components as optional components that if executed with the remaining motion gesture sequence will still permit access to the limited system resources. One or more optional motion gesture sequence components allows for greater variations to the motion gesture that still permit access. If the additional movements are unanticipated motions or pauses, the motion gesture will not be executed and this will still help eliminate inadvertent access.

FIG. 2B also illustrates various sensor components in a mobile information handling system embodiment to detect the components of the motion gestures according to the disclosures. One or both display screens or their respective housings may contain one or more accelerometers 250, geomagnetic sensors 240, cameras, or digital gyroscopes 230. Additional state sensors may also be present including a photocell ambient light sensor, a Hall Effect magnet and sensor, camera, touch/hover sensors, and other sensors as described above to determine, for example, if the laptop is open.

There is no requirement that all sensor types be present. For example, a sensor module may only need a motion detector and a reference sensor as described above to detect acceleration, velocity and direction of the laptop information handling system. For example, either an accelerometer 250 or a gyroscope 230 and one reference sensor such as a geomagnetic sensor 240 may be associated with the laptop information handling system 200B.

The example bounce embodiment may be designed to be simple to execute by the user. Thus, the orientation of the information handling system, the direction of movement, and the start and stop locations may vary to a reasonable degree to allow for variability in the motion gesture made by the user from time to time. For example, the laptop information handling system 200B has a display screen 211B (with integrated touchpad not shown) in housing 210B and keyboard 221B in housing 220B in the disclosed embodiment. The information handling system 200B may be tilted so that it is not in strictly in any particular planar orientation, and the motion gesture may still activate the limited, ad-hoc access system.

FIG. 2C shows an example of a tablet information handling system executing a motion gesture according to another embodiment of the invention. The laptop information handling system 200C is executing a shake gesture whereby the tablet information handling system 200C is shaken along a plane roughly perpendicular to the viewing vector by a user. The shake motion may be made by the user's hand 204C about the pivot of a user's wrist roughly in an ulnar and radial deviation motion while holding the tablet information handling system. Thus, the information handling system may execute a back and forth motion while be held roughly in one plane of motion. The number of shakes back and forth may be predetermined as one or multiple shake motions.

The motion gesture back and forth acceleration and deceleration directions may also only be roughly in a planar direction. For example, to account for some variation due to wrist pivot, a tilt or curve in the back and forth direction may be accommodated. In yet another variation on the embodiments disclosed, the starting point and the finishing point for the shake motion gesture may only be somewhat near one another or the start and finish locations of the shake motion gesture may not be relevant at all as long as the back acceleration/deceleration motion is followed shortly forward acceleration/deceleration motion. It is also a contemplated embodiment where one or either of the back motion and forward motion is to be detected first which will still trigger the motion gesture.

In an example embodiment, the sequence of actions for a shake may be to accelerate in a roughly backward (e.g., with a wrist ulnar deviation) direction, decelerate, stop, accelerate forward (e.g., with a wrist radial deviation) in the roughly reverse direction, then decelerate to a stop and pause for a predetermined amount of time. As stated, the forward motion first followed by the backward motion may be an option variation as well. Alternatively, in a 1.5 times shake, the backward acceleration and deceleration must be repeated before a stop and pause. In yet another series of embodiments, the backward acceleration and deceleration and forward acceleration and deceleration must be repeated multiple times before a stop and pause for additional shake cycles as desired. As with additional shake cycle embodiments, additional shake cycles will have an advantage of being more certain motion gestures intended to activate the limited, ad-hoc access system. This avoids potentially inadvertent movements activating access to limited system resources.

In yet another variation on the embodiments disclosed, the starting point and the finishing point for the shake motion gesture may not be near one another. In another embodiment, the start and finish locations of the shake gesture may not be relevant at all as long as the backward acceleration/deceleration motion is followed shortly by an forward acceleration/deceleration motion is detected. For example, the shake may proceed back in a forward direction a shorter distance than the backward motion followed by a pause of predetermined duration. The sequence of actions for a shake in this alternative embodiment may be to accelerate beyond a threshold in a roughly backward direction, a deceleration beyond a threshold deceleration, a stop of motion in the backward direction, acceleration then deceleration in the return or forward direction for a shorter period than the backward motion followed by a pause for a predetermined amount of time. As with all of the motion gestures, the level of accuracy required to execute the shake motion gesture will increase the certainty that a movement is intended as a motion gesture. However, greater requirement of accuracy will make the shake motion gesture more difficult to execute which may be less desirable in a scenario where a user requires quick and immediate access to some of the system resources. The balance between intention to activate and avoidance of inadvertent access may be customized via sensitivity settings.

The shake motion gesture may also begin with an optional initial motion before the first forward or backward motion is executed. For example, a optional upward or downward motion may be detected as the information handling system is brought into position to execute a motion gesture. The initial upward motion or downward motion may be an optional part of the required gesture movements or may be ignored until the first downward motion is detected in the motion gesture. The motion gesture may have some optional motion or pause components that if executed with the remaining motion gesture sequence will still permit access to the limited system resources. One or more optional motion gesture sequence components allows for greater variations to the motion gesture while still permitting access. If the additional movements are unanticipated motions or pauses, the motion gesture will not be executed if they are not part of the optional motion gesture components and this will still help eliminate inadvertent access.

FIG. 2C also illustrates various sensor components in a tablet information handling system embodiment to detect the components of the motion gestures according to the disclosures. The tablet information handling system 200C may contain one or more accelerometers 250, geomagnetic sensors 240, cameras, or digital gyroscopes 230. Additional state sensors may also be present including a photocell ambient light sensor, a Hall Effect magnet and sensor, camera, touch/hover sensors, and other sensors as described above.

There is no requirement that all sensor types be present. For example, a sensor module may only need a motion detector and a reference sensor as described above to detect acceleration, velocity and direction of the laptop information handling system. For example, either an accelerometer 250 or a gyroscope 230 and one reference sensor such as a geomagnetic sensor 240 may be associated with the tablet information handling system 200C.

The example shake embodiment may be designed to be simple to execute by the user. Thus, the orientation of the information handling system, the direction of movement, and the start and stop locations may vary to a reasonable degree to allow for variability in the motion gesture made by the user from time to time. For example, the tablet information handling system 200C has a display screen 211C in housing 210C in the disclosed embodiment. The information handling system 200C may be tilted so that it is not in strictly in any particular planar orientation, and the shake motion gesture may still activate the limited, ad-hoc access system.

FIG. 2D shows an example of a tablet information handling system executing a motion gesture according to yet another embodiment of the invention. The laptop information handling system 200D is executing a twist gesture whereby the tablet information handling system 200D is twisted along an axis 217D roughly perpendicular to the viewing vector by a user. The twist motion may be made by the user's hand 204D about the pivot of a user's wrist roughly in a supination/pronation motion while holding the tablet information handling system. Thus, the information handling system may execute a twist clockwise or twist counter-clockwise motion roughly along one imaginary axis motion through the tablet 200D. The number of twist clockwise or twist counter-clockwise motions may predetermined as one or multiple twist motions.

The twist motion gesture directions may also only be roughly along an axis of rotation. For example, to account for some variation due to wrist pivot, a tilt or curve in the twist clockwise or twist counter-clockwise motion direction may be accommodated. In yet another variation on the embodiments disclosed, the starting point and the finishing point for the twist motion gesture may only be somewhat in the same orientation or the start and finish orientation of the twist motion gesture may not be relevant at all as long as the twist clockwise or twist counter-clockwise motion occurs. It is also a contemplated embodiment where one or either of the twist clockwise or twist counter-clockwise motion is to be detected. In a multiple twist motion gesture, one or either the twist clockwise or twist counter-clockwise motion may be detected first to trigger the motion gesture.

In an example embodiment, the sequence of actions for a twist may be to accelerate then decelerate in a roughly twist clockwise (e.g., a right wrist supination motion) direction along an axis of rotation, decelerate, stop, and pause for a predetermined amount of time. As stated, the twist clockwise followed by the twist counter-clockwise motion may be an option variation as well. In that case the twist clockwise motion is followed by acceleration twist counter-clockwise (e.g., a right wrist pronation motion) in the roughly reverse direction, then decelerate to a stop and pause for a predetermined amount of time. Alternatively, in yet another series of embodiments, the twist clockwise or twist counter-clockwise acceleration and deceleration must be repeated multiple times before a stop and pause for additional twist cycles as desired. As with additional shake and bounce cycle embodiments, additional twist cycles will have an advantage of being more certain motion gestures intended to activate the limited, ad-hoc access system. This avoids potentially inadvertent movements activating access to limited system resources. As with all of the motion gestures, the level of accuracy required to execute the twist motion gesture will increase the certainty that a movement is intended as a motion gesture. However, greater requirement of accuracy will make the twist motion gesture more difficult to execute.

The balance between intention to activate and avoidance of inadvertent access may be customized via sensitivity settings.

The twist motion gesture may also begin with an optional initial motion before the first twist clockwise or twist counter-clockwise motion is executed. For example, an optional upward or downward motion may be detected as the information handling system is brought into position to execute the twist motion gesture. The initial upward motion or downward motion may be an optional part of the required gesture movements or may be ignored until the first twist clockwise or twist counter-clockwise motion is detected in the motion gesture. The motion gesture may have some optional motion or pause components that if executed with the remaining motion gesture sequence will still permit access to the limited system resources. One or more optional motion gesture sequence components allows for greater variations to the motion gesture while still limiting access from inadvertent movements.

FIG. 2D also illustrates various sensor components in a tablet information handling system embodiment to detect the components of the motion gestures according to the disclosures. The tablet information handling system 200D may contain one or more accelerometers 250, geomagnetic sensors 240, cameras, or digital gyroscopes 230. Additional state sensors may also be present including a photocell ambient light sensor, a Hall Effect magnet and sensor, camera, touch/hover sensors, and other sensors as described above. There is no requirement that all sensor types be present. As described above, a subset of orientation sensors may only be present.

The example shake embodiment may be designed to be simple to execute by the user. Thus, the orientation of the information handling system, the direction of movement, and the start and stop locations may vary to a reasonable degree to allow for variability in the motion gesture made by the user from time to time. For example, the tablet information handling system 200D has a display screen 211D in housing 210D in the disclosed embodiment. The information handling system 200D may be tilted so that it is not in strictly in any particular planar orientation, and the shake motion gesture may still activate the limited, ad-hoc access system.

Figure 3:
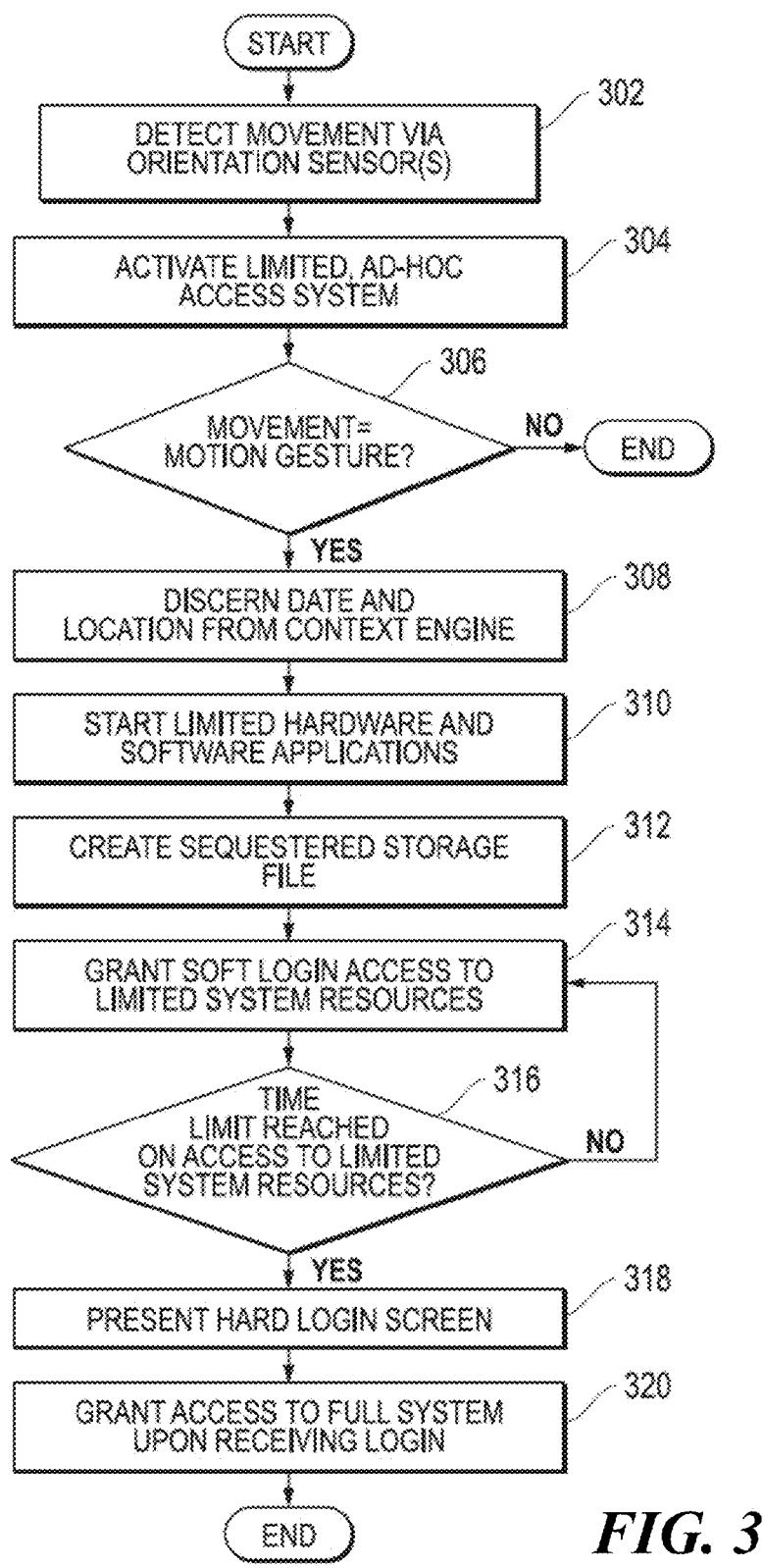
FIG. 3 is a flow diagram illustrating an example method embodiment for limited, ad-hoc access to one or more hardware systems or applications in response to a motion gesture with the information handling system.

FIG. 3 shows a flow diagram illustrating implementing a limited, ad-hoc access system for access to limited system resources for an information handling system according to one embodiment of the disclosure. Sensor data, context data, and working software application data are received and processed to determine the orientation, motion, and expected usage of software applications for the information handling system. The limited, ad-hoc access system then selects a subset of limited system resources to activate upon detecting a motion gesture. The information handling system then allows access to the limited resources in a sequestered environment. Full access may be granted upon execution of a hard login to access full system resources including temporarily saved files during the limited ad-hoc access.

The process begins at 302 where the orientation and motion sensors of the information handling system detect movement. The information handling system wakes from a dormant sleep state. At 304, the boot kernel invokes a limited, ad-hoc access system. The limited, ad-hoc access system receives sensor node motion and orientation data at decision diamond 306. At decision diamond 306, the method determines whether the sequence of movements and pauses equals a predetermined motion gesture. Example motion gestures are discussed above. If the sequence of movements and pauses is not a motion gesture, the flow ends. If the sequence of movements and pauses is determined to be a predetermined motion gesture, the flow proceeds to 308.

Proceeding to 308, the limited, ad-hoc access system accesses context data from a context engine. The context engine determines calendar, GPS location, and usage context data. With the context from the calendar and location, as well as software usage information, the flow proceeds to 310.

Based on the context engine, the limited, ad-hoc access system selects a subset of limited hardware and software applications. The limited, ad-hoc access system may start a limited operating system to enable use of the selected hardware and software applications. The flow proceeds 312 to create a sequestered storage file for use with the limited operating system or any selected limited hardware or software resources. The sequestered storage file or files is used to interact with and store any files created during the use of the selected limited system resources. At 314, the system grants access to the selected limited system hardware and software resources to the user.

The flow proceeds to decision diamond 316 to determine whether the limited ad-hoc access due to the motion gesture has expired. In the example embodiment, the limited, ad-hoc access to the sequestered resources is subject to a time limit. If the time limit has not been reached, the flow reverts back to 314 to continue to grant soft login access to the limited system resources.

If the time limit has been reached, the flow proceeds to 318 where a hard login request screen is presented on the information handling system. The hard login requires security verification such as those known in the art. For example, a password login or biometric verification may be required. Proceeding to 320, upon hard login verification of credentials of a user, the entire suite of system resources is made available to the user.

Figure 4:
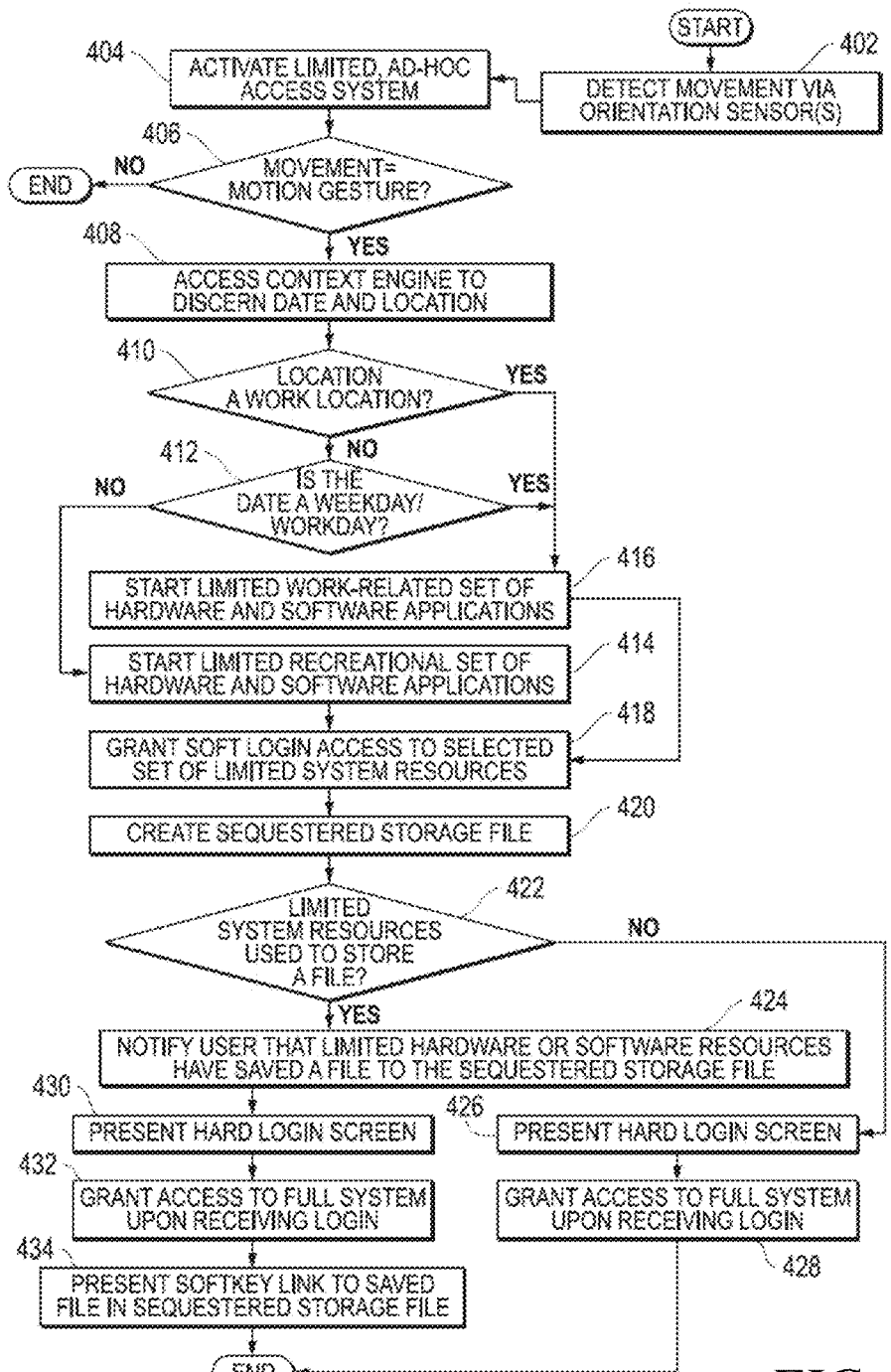
FIG. 4 is a flow diagram illustrating another example method embodiment for limited, ad-hoc access to one or more hardware systems or applications in response to a motion gesture with the information handling system and spatial-temporal context of the information handling system.

FIG. 4 shows a flow diagram illustrating another embodiment implementing a limited, ad-hoc access system for access to limited system resources for an information handling system.

The process begins at 402 where the orientation and motion sensors of the information handling system detect movement. The information handling system wakes from a dormant sleep state. At 404, the boot kernel invokes a limited, ad-hoc access system. The limited, ad-hoc access system receives sensor node motion and orientation data at decision diamond 406. At decision diamond 406, the method determines whether the sequence of movements and pauses equals a predetermined motion gesture as described with FIG. 3. If the sequence of movements and pauses is not a motion gesture, the flow ends. If the sequence of movements and pauses is determined to be a predetermined motion gesture, the flow proceeds to 408.

At 408, the limited, ad-hoc access system accesses context data from a context engine. The context engine determines calendar, GPS location, and usage context data. In the embodiment shown in FIG. 4, the limited, ad-hoc access system discerns the date and may determine time of day. Also determined is location at 408. With the context, the flow proceeds to 410.

Based on the date, time, and location context, the limited, ad-hoc access system determines whether the location is a work location at decision diamond 410. A work location may be determined based on a designation of the location as a location for work such as a corporate campus, office building location, or a portion of a college campus. If the location is determined to be a work location, the flow proceeds to 416.

If the location is not determined to be a work location, then the flow proceeds to decision diamond 412 where the limited, ad-hoc access system determines whether the date is a weekday or workday. The limited, ad-hoc system may also determine if the time of day falls within designated business hours. If it is a weekday or workday and during business hours, the flow proceeds to 416.

At 416, the limited, ad-hoc access system selects a subset of limited hardware and software applications designated as work-related software or hardware applications and systems. The limited, ad-hoc access system starts a limited operating system that is sequestered from the full resources of the information handling system to enable use of the work-related hardware and software applications.

If it is neither a work location nor a designated weekday or workday or designated business hours, the flow proceeds to 414. At 414, the limited, ad-hoc access system selects a subset of limited hardware and software applications designated as recreation-related software or hardware applications and systems. The limited, ad-hoc access system starts a limited operating system that is sequestered from the full resources of the information handling system to enable use of the recreational-related hardware and software applications. For the current embodiment, the limited ad-hoc access system selects between two subsets of limited resources depending on context. However, it is contemplated that the limited, ad-hoc access system may select from any number of subsets of limited system resources to be made available based on context and may not be limited to work-related applications versus recreational-related applications. These designations of subsets of limited system resources are used for illustrative purposes in the current embodiment. Upon starting the recreational-related software or hardware applications or systems, the flow proceeds to 418.

Whether from 414 or 416, the flow proceeds to 418 where the limited, ad-hoc access system grants soft login access to the selected set of limited system resources. Proceeding to 420, the limited, ad-hoc access system creates a sequestered storage file for use with the limited operating system and any of the selected limited hardware or software resources. The sequestered storage file or files are used to interact with and store any files created during the use of the selected limited system resources.

At decision diamond 422, the system determines whether the selected set of limited system resources were used to store a file. If not, after the time or other limitation on the soft login granted access has expired, the information handling system reverts to a typical security verification system and presents a hard login screen or other security measure to the user at 424. Upon receiving correct security credentials, full access is granted to system resources at 426 and then the flow ends.

If a file is stored by use of the selected set of limited system resources, then the flow proceeds to 428. At 428, the limited, ad-hoc access system provides an indication to the user of the selected subset of limited system resources that a file has been saved to the sequestered storage file. In one embodiment, the saved file may be only accessible after a hard login is entered to permit full access to system resources. Thus, a notification such as a sound indication, an LED, or an icon designation may be used to indicate that the file was successfully saved while using the limited system resources.

The flow proceeds to 430 where the information handling system presents a normal security access procedure to the user upon expiration of the limited, ad-hoc access granted via soft login from a motion gesture. At 432, upon receiving correct security credentials, full access is granted to system resources. At 434, the limited, ad-hoc access system presents a softkey link or other indication highlighting that a file was saved in the sequestered storage file during limited system access. At this point, the flow ends.

In one alternative embodiment, the softkey may be a link to access the sequestered file or files after the hard login. In another alternative embodiment, the temporarily stored file from the ad-hoc access may be constrained to appear on the system desktop after hard login for easy and quick access. The file may be a highlighted desktop icon.

In one specific embodiment, the temporarily saved file must be accessed within a limited amount of time, such as 10 minutes after hard login. If the temporarily saved file is not accessed within 10 minutes, the limited, ad-hoc access system may purge the file. This may be done on an assumption that the file was saved in error or is simply not necessary.

Figure 5:
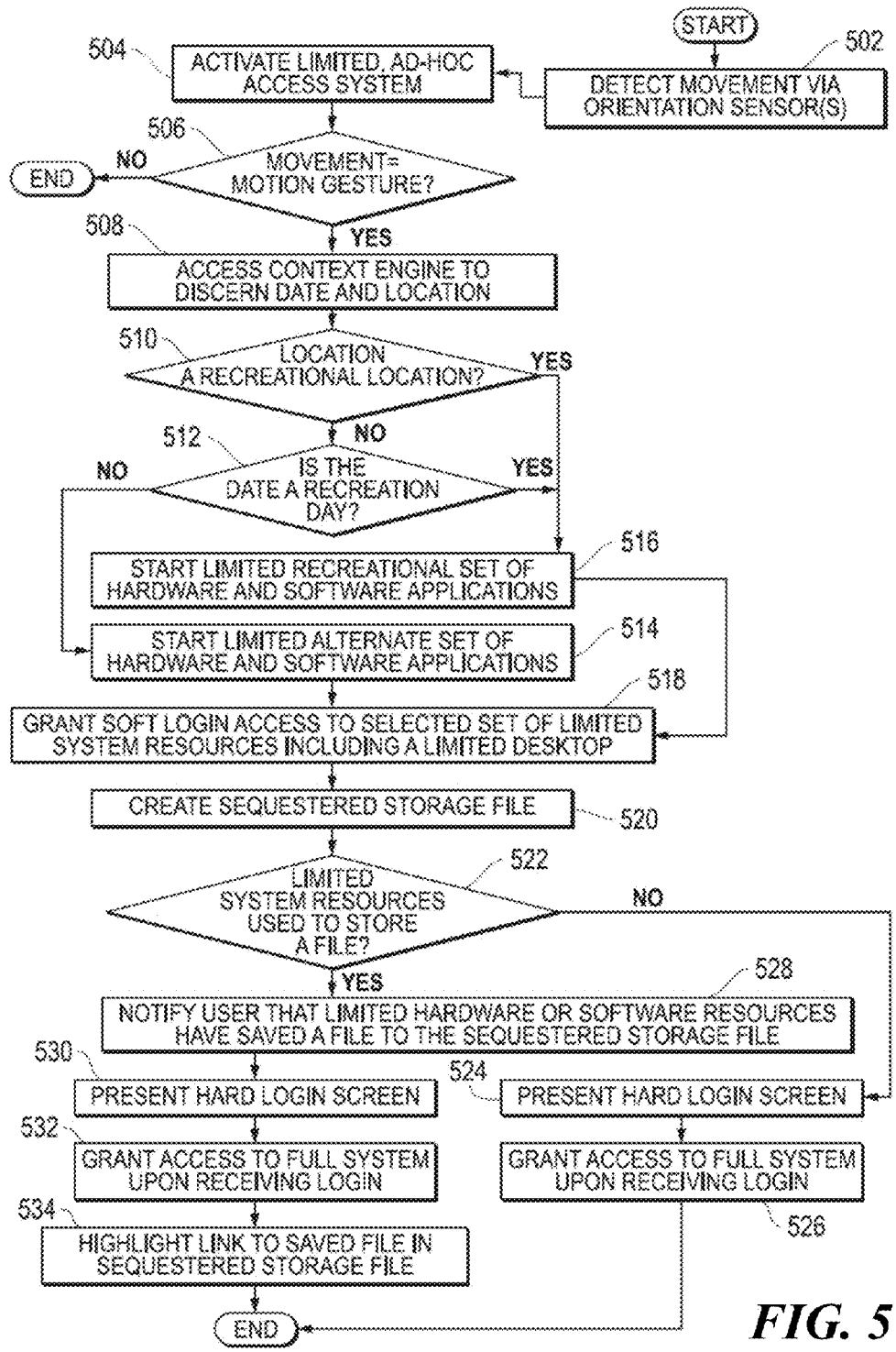
FIG. 5 is a flow diagram illustrating an example method embodiment for limited, ad-hoc access to one or more hardware systems or applications depending on motion of the information handling system.

It is understood that the flow steps of the method embodiment described in FIG. 4 may be performed in any order. For example, FIG. 5 shows a flow diagram illustrating another embodiment variation implementing a limited, ad-hoc access system for access to limited system resources for an information handling system.

The process begins at 502 where the orientation and motion sensors of the information handling system detect movement. The information handling system wakes from a dormant sleep state. At 504, the boot kernel invokes a limited, ad-hoc access system. The limited, ad-hoc access system receives sensor node motion and orientation data at decision diamond 506. At decision diamond 506, the method determines whether the sequence of movements and pauses equals a predetermined motion gesture as described above. If the sequence of movements and pauses is not a motion gesture, the flow ends. If the sequence of movements and pauses is determined to be a predetermined motion gesture, the flow proceeds to 508.

At 508, the limited, ad-hoc access system accesses context data from a context engine. The context engine determines calendar, GPS location, and usage context data. In the embodiment shown in FIG. 5, the limited, ad-hoc access system discerns the date and may determine time of day. Also determined is location of the mobile information handling system at 508. With the context, the flow proceeds to 510.

Based on the date, time, and location context, the limited, ad-hoc access system determines whether the location is a recreational location at decision diamond 510. A recreational location may be determined based on a designation of the location as a location for recreation such as a home location or a place where recreational applications are frequently used. If the location is determined to be a recreation location, the flow proceeds to 516. If the location is not determined to be a recreational location, then the flow proceeds to decision diamond 512 where the limited, ad-hoc access system determines whether the date is a weekend, vacation day, or a holiday. The limited, ad-hoc system may also determine if the time of day falls outside of designated business hours. If it is a weekend, vacation day, or holiday and outside of business hours, the flow proceeds to 516.

At 516, the limited, ad-hoc access system selects a subset of limited hardware and software applications designated as recreation-related software or hardware applications and systems. The limited, ad-hoc access system starts a limited operating system that is sequestered from the full resources of the information handling system to enable use of the recreation-related hardware and software applications.

If it is neither a recreation location nor a designated weekend or holiday or outside designated business hours, the flow proceeds to 514. At 514, the limited, ad-hoc access system selects an alternative subset of limited hardware and software applications. For example, the alternative subset may be designated as work-related software or hardware applications and systems. The limited, ad-hoc access system starts a limited operating system that is sequestered from the full resources of the information handling system to enable use of the alternative subset of hardware and software applications.

For the current embodiment, the limited ad-hoc access system selects between two subsets of limited resources depending on context. However, it is contemplated that the limited, ad-hoc access system may select from any number of subsets of limited system resources to be made available based on context and may not be limited to work-related applications versus recreational-related applications. These designations of subsets of limited system resources are used for illustrative purposes in the current embodiment. Upon starting the selected subset of software or hardware applications or systems, the flow proceeds to 518.

Whether from 514 or 516, the flow proceeds to 518 where the limited, ad-hoc access system grants soft login access to the selected set of limited system resources. Proceeding to 520, the limited, ad-hoc access system creates a sequestered storage file for use with the limited operating system and any of the selected limited hardware or software resources. The sequestered storage file or files are used to interact with and store any files created during the use of the selected limited system resources.

At decision diamond 522, the system determines whether the selected set of limited system resources were used to store a file. If not, after the time or other limitation on the soft login granted access has expired, the information handling system reverts to a typical security verification system and presents a hard login screen or other security measure to the user at 524. Upon receiving correct security credentials, full access is granted to system resources at 526 and then the flow ends.

If a file is stored by use of the selected set of limited system resources, then the flow proceeds to 528. At 528, the limited, ad-hoc access system provides an indication to the user of the selected subset of limited system resources that a file has been saved to the sequestered storage file. In one embodiment, the saved file may be only accessible after a hard login is entered to permit full access to system resources. Thus, a notification such as a sound indication, an LED, or an icon designation may be used to indicate that the file was successfully saved while using the limited system resources.

The flow proceeds to 530 where the information handling system presents a normal security access procedure to the user upon expiration of the limited, ad-hoc access granted via soft login from a motion gesture. At 532, upon receiving correct security credentials, full access is granted to system resources. At 534, the limited, ad-hoc access system presents a softkey link or other indication highlighting that a file was saved in the sequestered storage file during limited system access. In an embodiment, the softkey may be a link to access the sequestered file or files after the hard login. At this point, the flow ends.

A set of instructions for executing the methods steps described in the above embodiments on a processor may be stored and accessed from a computer-readable medium. The main memory unit 109 and disk drive unit 110 as shown in FIG. 1 may include a computer-readable medium in which one or more sets of instructions such as software can be embedded. The disk drive unit 110 also contains space for data storage. Further, the instructions may embody one or more of the methods or logic as described herein. In a particular embodiment, the instructions may reside completely, or at least partially, within main memory 109, the static memory or disk drive unit 110, and/or within the processor chipset(s) 108 during execution by the system 10. The main memory 109 and the processor chipset 108 also may include computer-readable media. The network interface device 40 can provide connectivity to a network 50, (e.g. a wide area network (WAN)), a local area network (LAN), wireless network, or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium of main memory 109 and static memory or disk drive unit 110 of FIG. 1 that includes instructions or receives and executes instructions responsive to a propagated signal; so that a device connected to a network interface device 40 can communicate voice, video or data over the network 50. Further, the instructions may be transmitted or received over the network 50 via the network interface device 40.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
    a processor to determine a first orientation of the information handling system from a plurality of orientation sensors;
    the processor determining a location of the information handling system;
    a sensor hub to detect a motion gesture of the information handling system;
    the processor activated from a sleep state by the motion gesture;
    a limited, ad-hoc access system also activated by the same motion gesture to permit access, via the processor, to a security-sequestered plurality of limited system resources for the information handling system;
    the processor executing a function via one of the security-sequestered plurality of limited system resources and storing resulting data in a security-sequestered storage file; and
    the processor restricting access to the resulting data in the security-sequestered storage file from the function via one of the security-sequestered plurality of limited system resources and requiring further authorization for access to the data in the security-sequestered storage file via a display presenting a hard login screen.

2. The system of claim 1, wherein the sensor hub detects the motion gesture and measures a velocity of the information handling system, and wherein if the velocity exceeds a threshold level, the limited, ad-hoc access system permits access to the limited system resources.

3. The system of claim 1, wherein detecting the motion gesture includes measuring a sequence of motion directions with at least one motion direction reaching a threshold level of acceleration of the information handling system.

4. The system of claim 1, wherein the security-sequestered plurality of limited system resources includes a limited desktop.

5. The system of claim 1, wherein the security-sequestered plurality of limited system resources includes a preset number of most recently-used software application files.

6. The system of claim 1, further comprising:
    a context engine to determine location and date for the information handling system,
    wherein the limited, ad-hoc access system permits access, via the processor, to a set of the security-sequestered plurality of limited system resources of the information handling system in response to the motion gesture and location of the information handling system determined by a context engine.

7. The system of claim 1, further comprising:
    the limited, ad-hoc access system permits access, via the processor, to a first set of limited system resources of the information handling system in response to a recreational location; and
    the limited, ad-hoc access system permits access, via the processor, to a second set of limited system resources of the information handling system in response to a work location.

8. A computer-implemented method of activating a security-sequestered plurality of limited system resources of an information handling system from a dormant state via a motion gesture comprising:
    determining, via a processor executing instructions, a first orientation of the information handling system from a plurality of orientation sensors;
    determining, via the processor, a calendar date;
    detecting a motion gesture of the information handling system and activating the information handling system by the motion gesture;
    permitting access, via a limited, ad-hoc access system also activated by the same motion gesture, to a security-sequestered plurality of limited system resources of the information handling system; and
    executing a function via one of the security-sequestered plurality of limited system resources for the information handling system and storing resulting data in a security-sequestered storage file; and
    restricting access to the resulting data in the security-sequestered storage file from the function via one of the security-sequestered plurality of limited system resources by requiring further authorization for access to the data in the security-sequestered storage file via a display presenting a hard login screen,
    wherein the security-sequestered plurality of limited system resources includes a limited desktop and security-sequestered storage file determined based on a calendar date by a context engine.

9. The method of claim 8, wherein detecting the motion gesture includes measuring the level of acceleration of the information handling system, and wherein if the sudden acceleration exceeds a threshold level, the limited, ad-hoc access system permits access to the limited system resources.

10. The method of claim 8, wherein detecting the motion gesture includes detecting a lift motion gesture of the information handling system via one or more information handling system orientation sensors to trigger access to the limited system resources.

11. The method of claim 8, further comprising:
    determining a location for the information handling system,
    permitting access via the limited, ad-hoc access system to a set of the security-sequestered plurality of limited system resources of the information handling system selected in response to the motion gesture, the calendar date, and the location of the information handling system determined by a context engine.

12. The method of claim 8, wherein permitting access to the security-sequestered plurality of limited system resources includes limited access to a camera hardware system on the information handling system.

13. The method of claim 8, wherein the security-sequestered plurality of limited system resources includes a preset number of most recently used software application files.

14. The method of claim 8, further comprising:
in response to expiration of a limit of time for access to the security-sequestered plurality of limited system resources, presenting the hard login screen for full access to the information handling system.

15. The method of claim 8, further comprising:
the limited, ad-hoc access system permits access, via the processor, to a first set of limited system resources of the information handling system in response to a calendar date reflecting a weekend day; and
the limited, ad-hoc access system permits access, via the processor, to a second set of limited system resources of the information handling system in response to a calendar date reflecting a weekday.

16. An information handling system comprising:
a processor to determine a motion gesture of the information handling system from a plurality of orientation sensors via a sensor hub;
the processor to activate the information handling system from a sleep state by the motion gesture;
determining, via the processor, a calendar date, wherein a context engine determines whether the calendar date is a recreation date or a work date;
a limited, ad-hoc access system also activated by the same motion gesture to permit access to a security-sequestered plurality of limited system resources of the information handling system determined selected based on the calendar date determined by the context engine;
the processor executing a function via one of the security-sequestered plurality of limited system resources and storing resulting data in a security-sequestered storage file; and
the processor restricting access to the resulting data in the security-sequestered storage file from the function via one of the security-sequestered plurality of limited system resources by requiring further authorization for access to the data in the security-sequestered storage file via a display presenting a hard login screen.

17. The system of claim 16, wherein the sensor hub detects the motion gesture by detecting a sequence selected from a plurality of movements, accelerations, or decelerations of the information handling system followed by a stop for a period of time.

18. The system of claim 16, wherein the security-sequestered plurality of limited system resources includes a limited desktop and a plurality of selected software applications.

19. The system of claim 16, wherein the further authorization includes a hard login event and upon gaining full access to the information handling system, provides a soft-key shortcut to access the files stored in the security-sequestered storage file.

20. The system of claim 16, further comprising:
the limited, ad-hoc access system permits access, via the processor operating a context engine, to a first set of limited system resources of the information handling system in response to determining that the information handling system is located at a recreational location; and
the limited, ad-hoc access system permits access, via the processor operating a context engine, to a second set of limited system resources of the information handling system in response to determining that the information handling system is located at a work location.

* * * * *